Jan. 26, 1943.  T. GROSSGUTH ET AL  2,309,390
PHOTOGRAPHIC METHOD OF MATCHING AND
SELECTING COIFFURES OR THE LIKE
Filed March 26, 1941  3 Sheets-Sheet 3

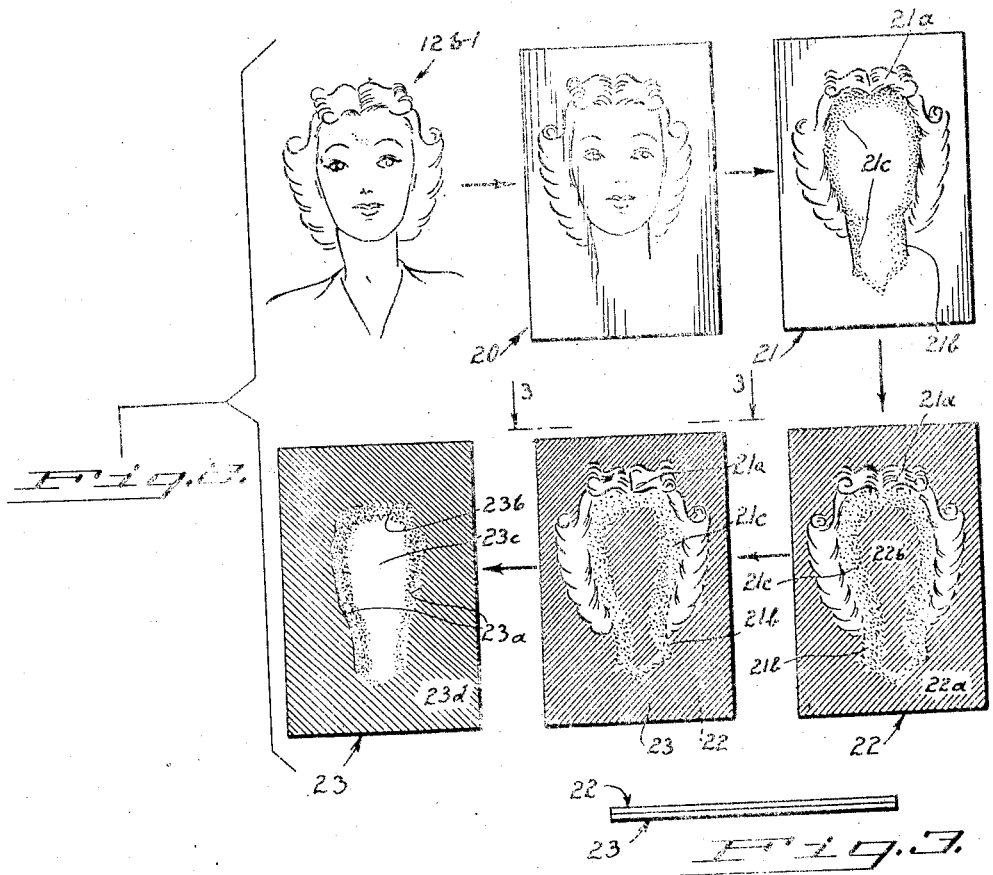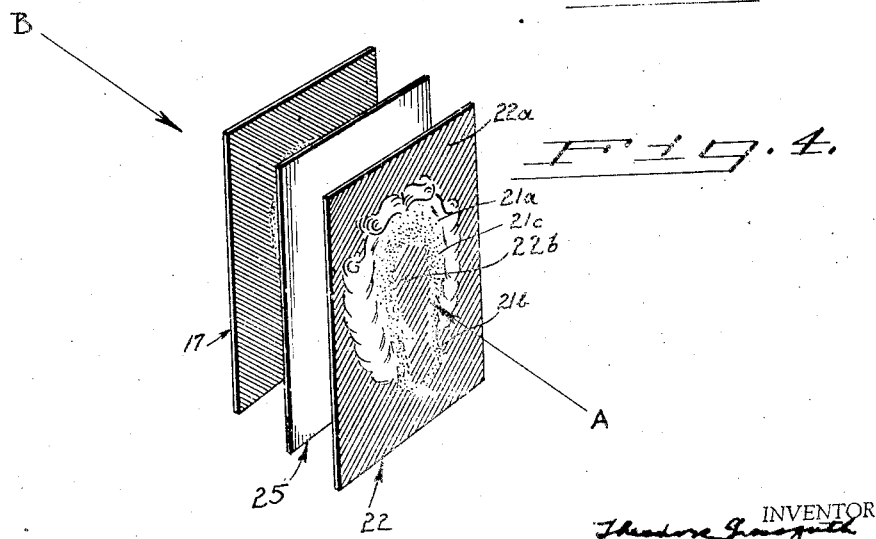

INVENTORS
Theodore Grossguth
William A. Geller
Conrad Vasquez
BY their [signature]
ATTORNEY.

Patented Jan. 26, 1943

2,309,390

UNITED STATES PATENT OFFICE 2,309,390

PHOTOGRAPHIC METHOD OF MATCHING AND SELECTING COIFFURES OR THE LIKE

Theodore Grossguth, William A. Spilo, and Conrad Vasquez, New York, N. Y., assignors to Lincoln Newspaper Features, Inc., New York, N. Y., a corporation of New York Application March 26, 1941, Serial No. 385,366

7 Claims. (Cl. 35—59)

This invention relates to improvements in methods for graphically representing the effect or appearance upon any person of predetermined styled coiffures or the like.

It is an object of a preferred embodiment of this invention to provide a method wherein there are assembled in advance a series of predetermined hair styles for the various face contours applied as photographic prints or the like in such conformation and assembly as to be photographically applied in combination with an original picture of one of the predetermined face types so that the resultant end product comprises a composite photograph embodying the facial contour and features of the subject in association with a coiffure preselected for the subject.

These and other advantages, capabilities and features of the invention will appear from the subjoined detailed description of one specific embodiment thereof illustrated in the accompanying drawings, in which Figure 1 is a schematic diagram illustrating the method of preparing the predetermined prints of the various coiffures to be applied in conjunction with a photograph of a subject, for forming the composite photograph defining the end product.

Figure 2 is a schematic view illustrating in detail the specific steps in the method for preparing one set of prints of the series of Figure 1 for one particular hair coiffure style.

Figure 3 is a plan view in section taken along lines 3—3 of Figure 2.

Figure 4 is an exploded diagrammatic view illustrating in detail the formation of the composite print formed as an end product printer.

Figure 1:
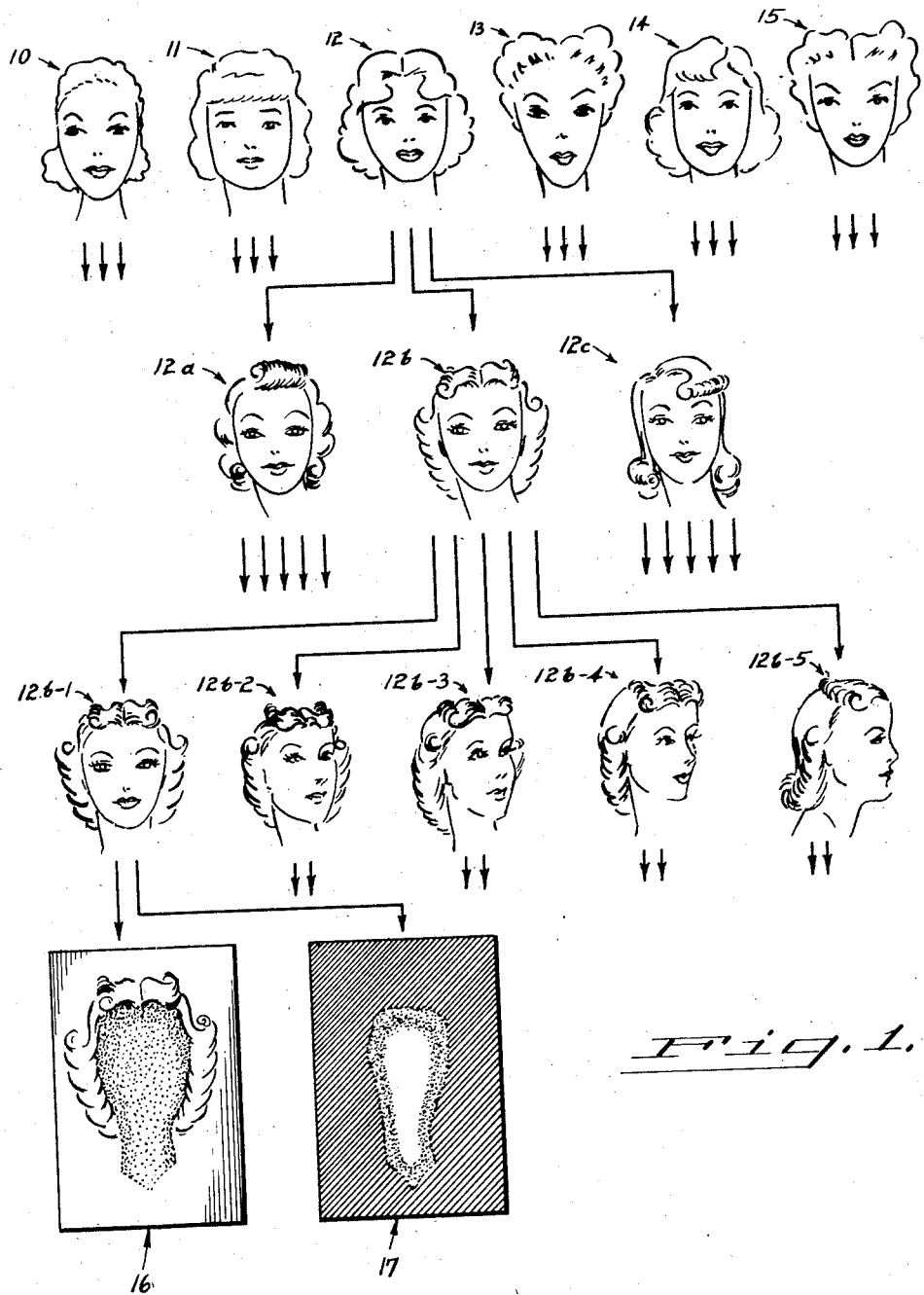

Referring to the reference characters in the drawings, and particularly Figure 1, there are represented in the top row thereof, a group of six face types numbered 10 to 15, the contours of such faces being generally all inclusive to cover the standard racial and physical conformations. In accordance with our invention, each of these face types may have prepared for it a series of coiffures as, for example, those for the afternoon, evening or sports on the one hand, or those involving alternate variations for different types of clothes, but generally it has been found that for any particular season or style trend, three or four types of coiffures will sufficiently encompass the normal variations capable of development by hair dressers for any specific face type.

For the purpose of illustration, a set of three different coiffures has been prepared for each of the face types in the first row of Figure 1 and are indicated in the second row of such figure by numbers 12a, 12b and 12c, the particular coiffures being directed to the round face type. These coiffures may be sketched by an artist, but for the purpose of our invention it is preferable to form these coiffures directly on a live model so that, as indicated in the third row of Figure 1, the next step in our method, which involves graphically illustrating one particular coiffure at different angular positions of the head may be readily produced as, for example, by photographing the live model in such respective positions which, for example, are indicated as five views, including the zero degrees or front view to ninety degrees or profile view. Such views are numbered respectively 12b—1 to 12b—5. Once having photographed the various angular views of each coiffure style for each face type, there are formed with respect to each of such prints, a "printer" unit illustrated in the bottom row of Figure 1, and comprising a standard print 16 and a companion mask 17, which elements are maintained for operative use as a unit, with the original photograph of the subject to form the composite end product, as will be described.

In Figures 2 to 4 there are illustrated in detail and sequentially the steps involved in the formation of the "printer" unit.

Reading in the direction of the arrows of Figure 2 and with reference to the coiffure for the round face, numeral 12b—1 represents a live model in the front or zero angular position provided with one of the preselected coiffures adaptable for such face type. Numeral 20 represents a positive print formed by photographing the model 12b—1 and carrying out the usual development, fixing and printing processes, except that this positive is printed on a transparent carrier for a purpose later to be described. Numeral 21 represents the positive print 20 of which the facial features within the face contour up to a short distance from the hair line have been removed by air blast, there being retained adjacent the hair line of the coiffure 21a and the neck line 21b a border zone 21c defining the skin texture zone, of gradually decreasing intensity from the hair and neck line towards the center.

The thus treated positive 21 is photographed to form after development and fixing the negative 22 wherein the background 22a and the central face area 22b are opaque. Thereafter, this negative 22 as shown in Figure 3 is superimposed by a clear celluloid plate 23 and the latter is painted by air brushing, so as to provide opaque surfaces corresponding to the background 22a and the coiffure 21a, while the skin texture zone is painted in a gradation from full to half tone, in the direction from the hair and neck line towards the center of the area defining the face contour; in the thus painted plate 23, numeral 23a represents the face contour of the particular round face type 12b—1, 23b represents the skin texture zone, 23c represents the central face area and 23d represents the background. The painted plate 23, for the purpose of simplicity, is photographed and printed as a positive to form and define the "companion" mask 17 shown generally in Figure 1.

In Figure 4 there is graphically illustrated the operative steps involved in forming the standard print represented as 16 in Figure 1. To form this print we apply for exposure respectively to negative 22 and mask 17 a film 25 which comprises a transparent center carrier having adjacent the opposite faces thereof successive layers, the innermost layer of which incorporates granular material not photographically affected and the outermost emulsion layers of which incorporate photographically sensitive material. The film 25 is at first exposed to the negative 22 disposed adjacent one side thereof by transmitted light in the direction of the arrow A, so that there is formed on each of the photographically sensitive layers thereof images of the coiffure in full tone and the skin texture zone adjacent the hair and neck line in substantially half tone, the granular material in the intermediate layers serving to diffuse the light passing towards the distant emulsion layer, so that the images formed thereon are not as pronounced as those in the emulsion layer adjacent the negative. Thereafter, film 25 is exposed to transmitted light in the direction of the arrow B passing through the companion mask 17 disposed adjacent the other face of the film, this exposure, however, being for a relatively short time period so that the image defining the facial contour is formed more or less in the nature of a dull half tone in the region of the facial features, while that portion defining the skin texture zone adjacent the hair and neck line is graduated in intensity to full tone as it approaches the hair and neck line. The film 25 exposed successively as heretofore outlined is thereafter developed and fixed to form the positive standard film 16 of the "printer" unit for use in conjunction with the mask, as indicated in the bottom row of Figure 1 and the function of which will be later described.

It should be noted in the development and fixing of the exposed film 25 that the intermediate layers incorporating the granular material are not in any way affected, and since the image within the face contour is more or less when printed of half tone effect, and the carrier of the film made of transparent material, the standard print defining the positive formed therefrom may be applied insofar as the facial contour area thereof to provide a ground glass effect for focusing purposes, as will be later described.

Figure 5:
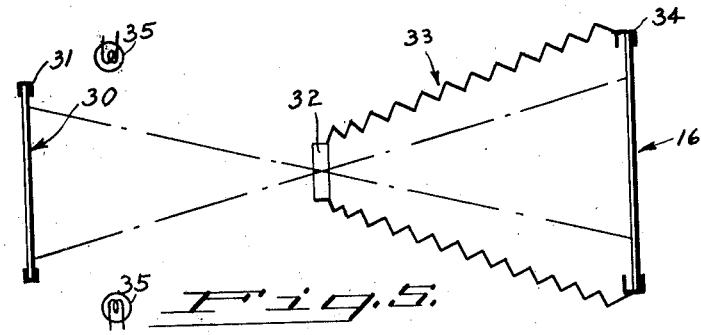
Figures 5, 6 and 7 are diagrammatic representations of the steps involved in forming through exposure of the original photograph of the subject and the end product prints of the predetermined coiffure to form the composite photograph incorporating the selected hair coiffure for the subject.
Figure 6:
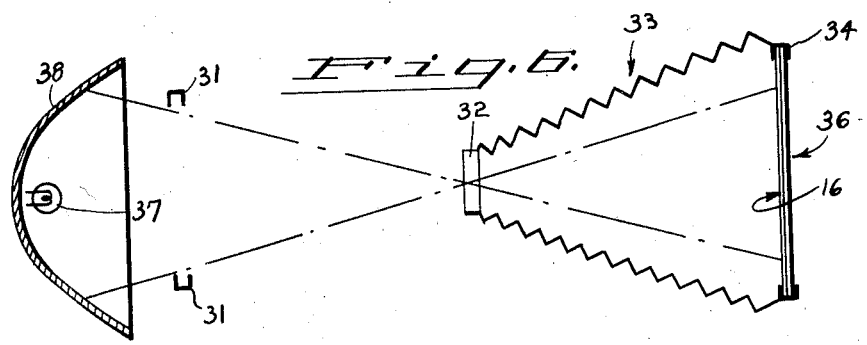
Figure 7:
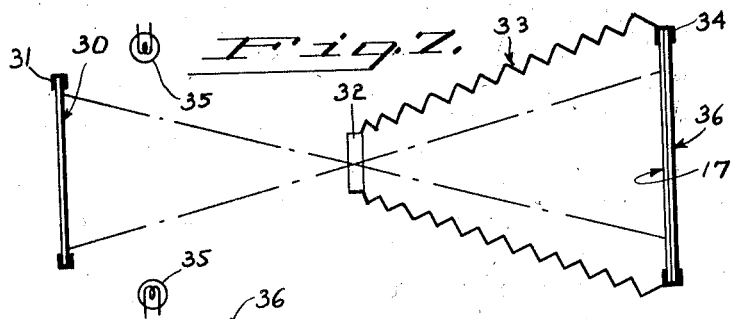

Reference is had to Figures 5 to 7, which diagrammatically represent the steps involved in forming the composite end product photograph. As shown in Figure 5, the photograph of the subject 30 is placed in the frame 31 in front of the lens 32 of camera 33 while in the reciprocable frame 34 of the camera there is inserted the standard print 16. A plurality of lamps 35 defining a light source are inserted between the lens of the camera and the frame carrying the photograph of the subject, so that the standard print 16 may be focused to align both vertically and horizontally, the face contour portion thereof with that of the original photograph and the granular particles in the intermediate layers of the film 25 forming the standard print 16, in this instance serve to provide a ground glass effect for such purpose.

The original photograph 30 is removed from its frame and a photographically sensitive film 36 is inserted in frame 34 at the rear of the standard print 16 and a light source 37 mounted in the reflector 38 is placed in front of the lens 33 and the sensitive film 36 is exposed by transmitted light to the standard print 16. Thereafter, removing the standard print 16 in the camera frame 34 and inserting in lieu thereof and in front of the film 36 the mask 17 and replacing the light source 37 and reflector 38 by the light sources 32 between the lens 33 and the frame 31 in which has been reinserted the original photograph of the subject 30, the film 36 is exposed to reflected light to the portion of the original photograph 30 embodying the facial features; the remainder of the film 36 having been heretofore exposed to the standard print 16 and being further blocked out by the opaque portions of the mask 17. The exposed film is thereafter developed and fixed and printed as a positive.

Figures 8, 9, 10:
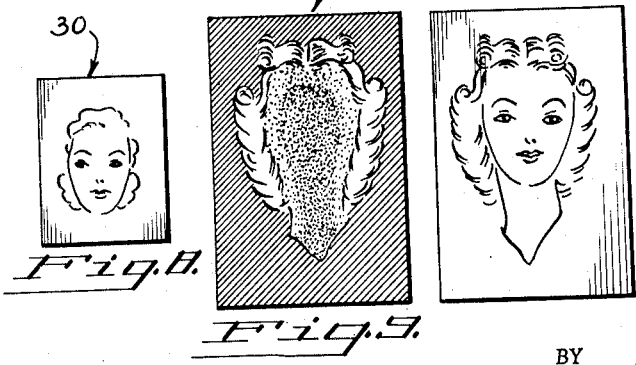
Figure 8 shows an original photograph of the subject.
Figure 9 represents the condition of the composite photograph at an intermediate stage of its formation exemplified in Figure 6.
Figure 10 shows the composite photograph incorporating the original facial features and contour in conjunction with the selected coiffure for the subject.

For illustrative purposes, Figure 8 represents the original picture 30 applied in the operative steps defined in Figures 5 and 7, Figure 9 represents the condition of the film 36 after the exposure thereof to the standard print 16 as carried out in Figure 6, while Figure 10 represents the end product composite photograph as a result of the successive exposures in Figures 6 and 7, development, fixing and printing.

Although the description of the preferred embodiment of this invention has been directed to the formation of composite representations of preselected coiffures in association with facial contours and features of particular types, it is within the province of this invention to apply the steps herein outlined to other fields of endeavor wherein composite end products incorporate certain predetermined and maintained features or elements to which there are applied preselected associated features or elements, as for example: This may be applied to wearing apparel such as millinery, shoes and the like, while the same may be readily adaptable in other arts, as for example, redesigning homes, redecorating rooms, etc.

It is obvious that various changes and modifications may be made to the details of construction without departing from the general spirit of the invention as set forth in the appended claims.

We claim:

1. In a method of forming from an original photograph of a subject a composite photograph of such subject depicting in lieu of an element disclosed in the original photograph, one of several predetermined similar elements of a type adaptable for the subject, wherein a series of pictorial representations at different angular views has been prepared for each of a plurality of predetermined elements adaptable in association with the configurations of different types of subjects, the steps of forming from each of such pictorial representations separate photographic prints, one defining the element and the other defining the outline of that portion of the subject associated with said element, all portions other than those defined in each of such prints being opaqued, making from each of the aforesaid photographic prints a standard print, wherein is represented the element and the outline of that portion of the subject associated with said element defined in the aforesaid prints, and after preselecting that predetermined element of the type best adaptable for use with the original photograph of the subject, exposing a film to the standard print corresponding to the preselected pictorial representation by transmitted light and thereafter exposing the film to that portion of the original photograph normally associated with the element being substituted by reflected light through the photographic print defining the outline of that portion of the subject associated with said element.

2. In a method of forming from an original photograph of a subject a composite photograph of such subject depicting in lieu of an element disclosed in the original photograph, one of several predetermined similar elements of a type adaptable for the subject, wherein a series of pictorial representations at different angular views has been prepared for each of a plurality of predetermined elements adaptable in association with the configurations of different types of subjects, the steps of forming from each of such pictorial representations separate photographic prints, one defining the element and the other defining the outline of that portion of the subject associated with said element, all portions other than those defined in each of such prints being opaqued, making from the aforesaid prints a standard print comprising a photographic film incorporating an image carrying layer wherein there are represented the element and the outline of that portion of the subject associated with said element defined in the prints and a diffusive medium carrying layer thereadjacent, and after preselecting that predetermined element of the type best adaptable for use with the original photograph of the subject, mounting the standard film in a camera and focusing the same through the diffusive medium thereof, so that the outline of that portion of the subject associated with said element defined in said print is aligned with that of the original photograph of the subject, inserting a sensitized film in the camera at the rear of the standard print, and exposing the same to the standard print by transmitted light and thereafter removing the standard print from the camera, replacing the same by the photographic print defining the outline of that portion of the subject associated with said element and exposing the sensitized film by reflected light through the outline defining print to that portion of the subject matter associated with the element.

3. In a method of forming from an original photograph of a subject a composite photograph of such subject depicting in lieu of the coiffure disclosed in the original photograph, one of several predetermined coiffures of a style adaptable for the subject, wherein a series of pictorial representations at different angular views has been prepared for each of a plurality of predetermined coiffure styles adaptable in association with the facial contours of different types of subjects, the steps forming from each of such pictorial representations separate photographic units, one defining the coiffure and the skin zone adjacent the hair line thereof and the other defining the facial contour and the skin zone adjacent the hair line thereof, all portions other than those defined in each of such prints being opaqued, making from each of the aforesaid photographic prints a standard print, wherein is represented the coiffure, the face contour and the skin zone adjacent the hair line thereof defined in the aforesaid prints, and after preselecting that predetermined coiffure style best adaptable for use with the original photograph of the subject, exposing a film to the standard print corresponding to the preselected pictorial representation by transmitted light and thereafter exposing the film to the facial features of the original photograph by reflected light, through the photographic print defining the facial contour and skin zone adjacent the hair line.

4. In a method of forming from an original photograph of a subject a composite photograph of such subject depicting in lieu of the coiffure disclosed in the original photograph, one of several predetermined coiffures of a style adaptable for the subject, wherein a series of pictorial representations at different angular views of each has been prepared for a plurality of predetermined coiffure styles adaptable in association with the facial contours of different types of subjects, the steps forming from each of such pictorial representations separate photographic prints, one defining the coiffure and the skin zone adjacent the hair line thereof and the other defining the facial contour and the skin zone adjacent the hair line thereof, all portions other than those defined in each of such prints being opaqued, making from the aforesaid prints a standard print comprising a photographic film incorporating an image carrying layer wherein there are represented the coiffure and the skin zone adjacent the hair line thereof, and face contour and the skin zone adjacent the hair line thereof defined in the prints and a diffusive medium carrying layer thereadjacent, and after preselecting that predetermined coiffure style best adaptable for use with the original photograph of the subject, mounting the standard film in a camera and focusing the same through the diffusive medium thereof, so that the facial contour of said print is in alignment with that of the original photograph of the subject, inserting a sensitized film in the camera at the rear of the standard print, and exposing the same to the standard print by transmitted light and thereafter removing the standard print from the camera, replacing the same by the face contour print and exposing the sensitized film by reflected light through the face contour print to the features of the original photograph within the facial contour thereof.

5. In the method of forming from an original photograph of a subject, a composite photograph of such subject depicting in lieu of the coiffure disclosed in the original photograph, one of several predetermined coiffures of a style adaptable for the subject, wherein a series of pictorial representations at different angular views has been prepared for a plurality of predetermined coiffure styles in association with facial contours of different types of subjects, the steps forming from each of such pictorial representations separate photographic prints one defining the coiffure only of each such representation and the other defining the facial contour only of each such representation, the facial area within the facial contour print being made substantially translucent, and all other portions of such prints being opaqued, making a printer incorporating spaced layers separated by a diffusive medium, on the respective layers of which are formed images of the coiffure and face contour of said photographic prints, and after preselecting from a group of prints a coiffure and facial contour of the angle and type best fitted for the subject under treatment, centering in a photographic apparatus the printer in relation to the original photograph of the subject, printing by direct light the coiffure of the preselected printer onto a photographic film, and printing by reflected light the facial features within the face contour of the subject of the original photograph through the face contour print onto the film.

6. In a method of forming from an original photograph of a subject a composite photograph of such subject depicting in lieu of the coiffure disclosed in the original photograph, one of several predetermined coiffures of a style adaptable for the subject, wherein a series of pictorial representations at different angular views has been prepared for each of a plurality of predetermined coiffure styles adaptable in association with the facial contours of different types of subjects, the steps forming from each of such pictorial representations separate photographic prints, one defining the coiffure only and the other defining the facial contour enclosing a transparent area, all portions other than those defined in each of such prints being opaqued, photographically combining the aforesaid photographic prints to form on a multi-layer film a standard print, one of the layers of which carries a diffusion medium and wherein on at least one layer is represented the coiffure and the face contour defined in the aforesaid prints, and after preselecting that predetermined coiffure style best adaptable for use with the original photograph of the subject, focusing the corresponding standard print in a camera, so that the facial contour thereof is in alignment with that of the original photograph of the subject, printing upon a film in a camera the standard print by transmitted light and thereafter printing by reflected light onto the film in the camera the facial features of the original photograph through the transparent area of the photographic print defining the facial contour.

7. In a method of forming from an original photograph of a subject, a composite photograph of such subject depicting in lieu of the coiffure disclosed in the original photograph, one of several predetermined coiffures of a style adaptable for the subject, wherein a series of pictorial representations at different angular views has been prepared for a plurality of predetermined coiffure styles applied in association with facial contours of different types of subjects, the steps forming from each of such pictorial representations companion units, one comprising a print defining the coiffure and the skin zone adjacent the hair line thereof, and the other comprising a mask opaquing all portions of the pictorial representation except the facial contour and the skin zone adjacent the hair line thereof, making from said companion units by exposure a standard print incorporating spaced layers separated by a diffusive medium wherein there are represented on the respective layers thereof as images, the coiffure in full tone and the face contour in half tone, and the skin zone adjacent the hair line of each thereof in half tone, and after preselecting from a group of pictorial representations that predetermined coiffure style best adaptable for use with the original photograph of the subject, focusing the standard print corresponding thereto in a camera with the original photograph to align the facial contours of the same, exposing a photographic film to the standard print by transmitted light, thereafter exposing the photographic film to the face of the original photograph through the mask by reflected light, and treating the thus exposed photographic film to form a positive photographic print.

THEODORE GROSSCUTH.
WILLIAM A. SPILO.
CONRAD VASQUEZ.